Figure 1:
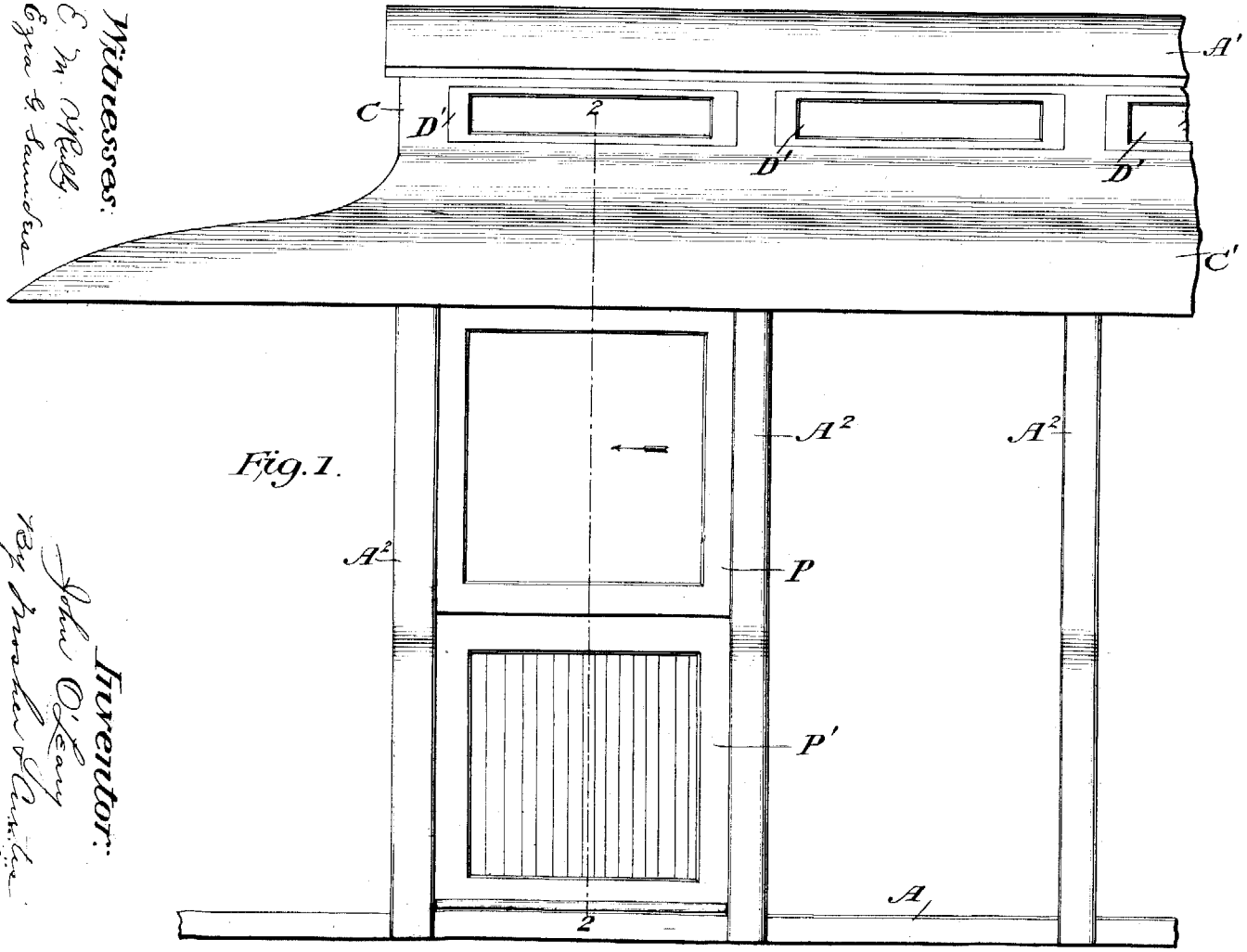

No. 11,992.

Reissued May 20, 1902.

J. O'LEARY.

CONVERTIBLE CAR.

(Application filed Mar. 21, 1902.)

2 Sheets—Sheet 1.

Witnesses:
E. M. O'Reilly.
Ezra G. Saunders

Inventor:
John O'Leary
By Mosher & Austin
Attys.

No. 11,992. Reissued May 20, 1902.
J. O'LEARY.
CONVERTIBLE CAR.
(Application filed Mar. 21, 1902.)
2 Sheets—Sheet 2.
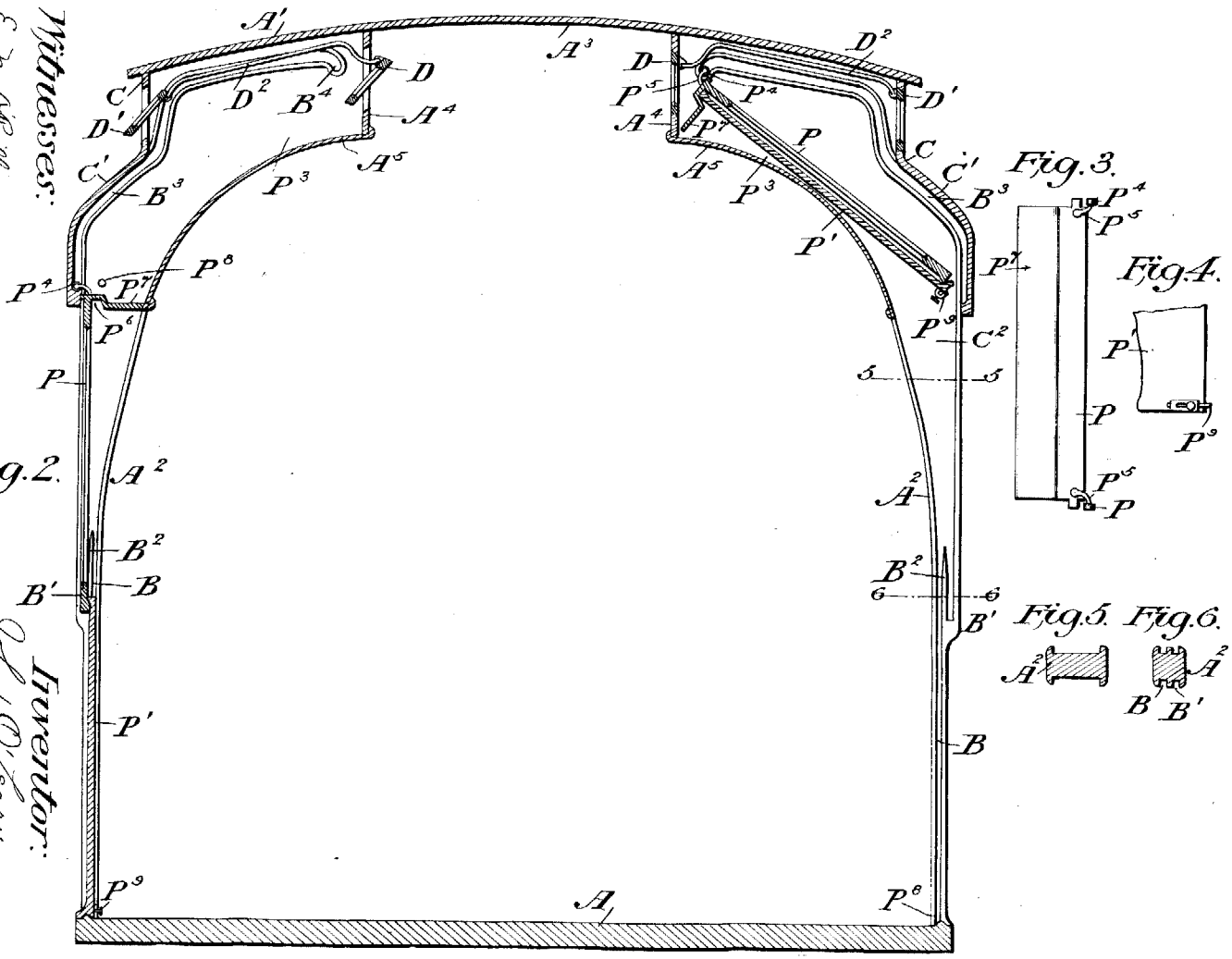
Witnesses:
E. M. O'Reilly
Ezra G. Saunders
Inventor:
John O'Leary,
By Mosher & Curtis
Attys.

UNITED STATES PATENT OFFICE.

JOHN O'LEARY, OF COHOES, NEW YORK, ASSIGNOR, BY DIRECT AND MESNE ASSIGNMENTS, OF FIVE-SIXTHS TO LE ROY VERMILYEA, OF COHOES, NEW YORK.

CONVERTIBLE CAR.

SPECIFICATION forming part of Reissued Letters Patent No. 11,992, dated May 20, 1902.

Original No. 664,890, dated January 1, 1901. Application for reissue filed March 21, 1902. Serial No. 99,360½.

*To all whom it may concern:*

Be it known that I, JOHN O'LEARY, a citizen of the United States, residing at Cohoes, county of Albany, and State of New York, have invented certain new and useful Improvements in Convertible Cars, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures therein.

Figure 1 of the drawings is a side elevation of an end portion of my improved car. Fig. 2 is a vertical cross-section of the same, taken on the broken line 2 2 in Fig. 1 looking to the left. Fig. 3 is a top plan view of the upper edge of the sash and cap detached. Fig. 4 is a plan view of a lower corner portion of one of the panels detached, showing a spring-catch. Fig. 5 is a cross-section of one of the vertical ribs, taken on the broken line 5 5 in Fig. 2. Fig. 6 is a similar view taken on the broken line 6 6 in Fig. 2.

A is the bottom or floor of the car, and A′ is the top or roof. The top is connected with the bottom by the supporting vertical posts or ribs $A^2$.

$A^3$ is the usual deck-opening in the top of the car, formed by the vertical deck-walls $A^4$, raised from the inner roof or ceiling $A^5$ and covered by the outer roof A′.

The object of my invention is to provide a convertible car with a convenient means for storing the movable inflexible panels which inclose the sides of the car in inclement weather when the panels are removed from the sides of the car to provide an open car without materially changing the interior or exterior dimensions of the car.

The invention consists of the novel construction hereinafter described, and particularly specified in the claims.

In Fig. 2 the left-hand side of the car is shown closed by the sash-panel P and the solid panel P′, while the part of the car at the right-hand side is shown open, the respective panels being stored in the storage-chamber $P^3$, formed between the inner and outer roofs of the car. The ribs are each provided with a slideway B for the lower or solid panel and a separate slideway B′ for the upper or sash panel. The slideways are preferably separated at the lower end of the sash-panel slideway by the stop $B^2$, which terminates about midway between the upper and lower ends of the rib and above which the two slideways merge into each other and gradually increase in width and incline inwardly to the top of the car. Just outside the merged slideways I provide a guideway consisting of a groove $B^3$, adapted to receive a roller $P^4$, rotatively supported by a stem or bracket $P^5$, secured to and projecting from one end of the sash-panel.

To change the car from a closed to an open car, it is only necessary to slide the panels upwardly along their slideways in the ribs from the closed position shown on the left in Fig. 2 to the open position shown on the right in the same figure. The roller guides the upper edge of the sash-panel, and the upper edge of the solid panel entering the channel $P^6$ in the cap $P^7$ on the upper edge of the sash-panel is guided thereby. The lower edges of the two panels are supported by a spring-bolt $P^9$, adapted to enter a receiving-socket $P^8$ in the body of the rib. Both of the vertical edges of the panels are supported in the same manner, each edge by its neighboring rib.

As a means for concealing and protecting the panels when not in use, I provide the storage-chambers $P^3$ by continuing the roof of the raised deck on practically the same curve nearly to the vertical sides of the car, as seen in Fig. 2, where I provide the vertical ventilator-walls C, then curving the lower roof-wall C′ down to the sides of the car in substantially the usual manner. These chambers have at the lower edge of the inner roof or ceiling an opening or mouth $C^2$, as wide as the width of the merged panel-slideways at that place, which mouth is closed when the panels are down by the cap $P^7$ on the upper edge of the sash-panel. The object of closing this mouth of the chamber when the car is closed is to protect the passengers from downward drafts of air.

As a means for ventilating the car when closed I connect the usual ventilator-valves D in the deck-walls with similar valves D′ on the outer vertical walls of the chamber by means of a link $D^2$, pivoted at its ends to the respective valves, thereby maintaining the usual interior and exterior appearance and dimensions.

The guideway $B^3$ extends throughout its length in close proximity to the outer wall and roof of the car, following the outline of the outer and upper side of the deck-chamber, whereby the panels can be raised approximately to the top of the deck-chamber with comparatively little inward movement or incline, and the inward movement of the upper ends of the panels, occurring after the lower ends of the panels are well up into the mouth $C^2$ of the chamber, does not necessitate any considerable enlargement of the mouth in width, such as would make the opening unsightly or conspicuous. By thus extending the guideway in an irregular path, so as to take advantage of the full height of the deck-chamber during the first part of the movement of raising the panels, I am able to make use of inflexible comparatively straight panels, which could not otherwise be done without greatly enlarging the mouth $C^2$ of the chamber. The extreme end of the guideway is depressed or recessed, as at $B^4$, to form a seat for the roller, which automatically holds the upper end of the upper panel in position until forcibly released.

What I claim as new, and desire to secure by Letters Patent, is—

1. In a convertible car, the combination with the decked roof, grooved roof-supporting ribs, and a series of inflexible slide-panels vertically movable in the rib-grooves; of a corresponding series of storage-chambers extending from one side of the car approximately to the top of the deck of the car, substantially as described.

2. In a convertible car, the combination with a series of upwardly and inwardly inclined storage-chambers subjacent to the roof of the car; severally provided with oppositely-located upwardly and inwardly inclined slideways; of a corresponding series of inflexible panels vertically movable in slideways in the vertical side walls of the car and severally provided with guides movable in the respective inclined chamber-slideways, substantially as described.

3. In a railway-car, the combination with a chamber extending from the raised deck to the side of the car; of a pair of ventilator-valves, one opening from the chamber through the upper side wall of the car exteriorly of the car, and the other opening from the chamber through the side wall of the deck interiorly of the car; and a connecting-link between the two valves, substantially as described.

4. In a convertible car, the combination with a pair of vertically-movable mutually-lapping panels; of a pair of panel-supporting ribs, each rib having, intermediately of its lower and upper ends, separate slideways for the respective panels, which slideways merge into each other and gradually increase in width and incline inwardly from the merging point toward the top of the car, substantially as described.

5. In a convertible car, the combination with a series of upwardly and inwardly inclined storage-chambers, subjacent to the car-roof; of a corresponding series of inflexible slide-panels each vertically movable in slideways gradually increasing in width from a point in the side wall of the car about midway of its top and bottom, to the mouth of the superposed storage-chamber, where they correspond in width with such mouth, and a horizontal projection on the upper edge of a movable panel for closing the mouth of the chamber, substantially as described.

6. In a convertible car, having a decked roof, the combination with an inclosed deck-chamber extending upwardly and inwardly from the side of the car and provided at its outer and lower end with a downwardly-opening mouth, of a guideway extending in an irregular path from a point near the mouth of such chamber in close proximity to the outer and upper wall of such chamber approximately to the top of the deck; panel-supporting vertical ribs, and an approximately straight and inflexible panel provided with a guide on its upper end movable along said guideway, substantially as described.

7. In a convertible open and closed car, the combination of the sliding window sashes and panels, one of said parts being formed with an abutment for the other to bear against and for sustaining one part from the other as they are raised, and means for supporting the sashes and panels in the space between the chamber-walls in the top of the car, substantially as described.

8. In a convertible open and closed car, the combination of the sliding window sashes and panels, one of said parts being formed with an abutment for the other to bear against and for sustaining one part from the other when they are raised, and means for supporting the sashes and panels in the space between the ceiling and roof of the car, substantially as described.

9. In a convertible open and closed car, the combination of the sliding window sashes and panels, one of said parts being formed with an abutment having a recess to receive a portion of the other, so that the parts may be moved together and one be supported from the other when stored in the space between the ceiling and roof of the car, substantially as described.

10. In a convertible open and closed car, the combination of the sliding window sashes and panels, members formed with ways to guide said parts when sliding; a pintle or roller secured to one of said parts; and members formed with ways in the space between the ceiling and roof of the car to receive said pintles and rollers for guiding said parts in said space, substantially as and for the purposes described.

11. In a convertible open and closed car, the combination of the sliding window sashes and panels, means for sustaining said parts in a chamber in the upper part of the car; and ventilating-openings formed in the opposite walls of said chamber communicating respectively with the external atmosphere and with the interior of the car, and communicating with each other through said chamber, substantially as described.

12. In a convertible open and closed car, the combination of the sliding window sashes and panels, means for sustaining said parts in the space between the ceiling and roof of the car, and ventilating-openings formed in the ceiling and in the portion of the car outside of said space and communicating with the space between the ceiling and roof, substantially as and for the purposes described.

13. In a convertible open and closed car, the combination with the car-body having a panel-receiving recess or chamber extending inwardly from the side wall of the car, and side ribs provided with panel supporting and guiding grooves leading to said chamber; of an inflexible panel; means for guiding said panel along the grooved ribs and into and out of said chamber; and means for supporting said panel in an inclined position in said chamber.

14. In a convertible open and closed car, the combination with the car-body having a panel-receiving recess or chamber extending inwardly from the side wall of the car, and side ribs provided with panel supporting and guiding grooves leading to said chamber; of a plurality of inflexible panels; means for guiding said panels along the grooved ribs and into and out of said chamber, and means for supporting said panels in inclined position, one above another, in said chamber.

15. In a convertible car, the combination with the car-body having open sides, and a plurality of posts extending vertically across the open sides, and severally provided with vertical slideways and adapted to close the several intervals between the posts, a chamber in the upper part of the car adapted to receive the panels when raised; and provided with ventilating-apertures in its walls, means for regulating and controlling the ventilation through such apertures; and a movable bottom for said chamber, substantially as described.

In testimony whereof I have hereunto set my hand this 10th day of March, 1902.

JOHN O'LEARY.

Witnesses:

FRANK C. CURTIS,

E. M. O'REILLY.

DISCLAIMER.

11,992. (Reissue.)—*John O'Leary*, Cohoes, N. Y. CONVERTIBLE CAR. Patent dated May 20, 1902. Disclaimer filed January 7, 1907, by inventor and assignee.

Enter their disclaimer—

"To that part of the claim in said specification which is in the following words, to wit:

"7. In a convertible open and closed car, the combination of the sliding window sashes and panels, one of said parts being formed with an abutment for the other to bear against and for sustaining one part from the other as they are raised, and means for supporting the sashes and panels in the space between the chamber-walls in the top of the car, substantially as described.

"8. In a convertible open and closed car, the combination of the sliding window sashes and panels, one of said parts being formed with an abutment for the other to bear against and for sustaining one part from the other when they are raised, and means for supporting the sashes and panels in the space between the ceiling and roof of the car, substantially as described.

"9. In a convertible open and closed car, the combination of the sliding window sashes and panels, one of said parts being formed with an abutment having a recess to receive a portion of the other, so that the parts may be moved together and one be supported from the other when stored in the space between the ceiling and roof of the car, substantially as described." [*Official Gazette, January 15, 1907.*]